(12) United States Patent
Dvir

(10) Patent No.: US 8,503,815 B2
(45) Date of Patent: Aug. 6, 2013

(54) HIGHLIGHT RECOVERY USING DIGITAL LIGHTING MODULE

(75) Inventor: Itsik Dvir, Haifa (IL)

(73) Assignee: CSR Technology, Inc., Sunnyvale, CA (US)

( * ) Notice: Subject to any disclaimer, the term of this patent is extended or adjusted under 35 U.S.C. 154(b) by 1600 days.

(21) Appl. No.: 11/752,817

(22) Filed: May 23, 2007

(65) Prior Publication Data

US 2008/0292206 A1 Nov. 27, 2008

(51) Int. Cl.
*G06K 9/40* (2006.01)
(52) U.S. Cl.
USPC ........... 382/274; 382/254; 382/260; 382/270; 382/164
(58) Field of Classification Search
USPC .......................................... 382/274; 345/617
See application file for complete search history.

(56) References Cited

U.S. PATENT DOCUMENTS

| | | | | |
|---|---|---|---|---|
| 3,641,268 A * | 2/1972 | Beck | ............................ | 348/625 |
| 4,466,018 A | 8/1984 | Soneda et al. | | |
| 4,695,884 A * | 9/1987 | Anastassiou et al. | ......... | 348/615 |
| 5,867,170 A * | 2/1999 | Peterson | ........................ | 345/592 |
| 6,289,136 B1 * | 9/2001 | Oshino et al. | ................. | 382/298 |
| 6,788,822 B1 | 9/2004 | Zhang et al. | | |
| 6,807,299 B2 | 10/2004 | Sobol | | |
| 6,822,762 B2 | 11/2004 | Moroney et al. | | |
| 6,862,373 B2 | 3/2005 | Enomoto | | |
| 7,088,388 B2 | 8/2006 | MacLean et al. | | |
| 7,158,686 B2 | 1/2007 | Gindele | | |
| 2003/0038957 A1 | 2/2003 | Sharman | | |
| 2004/0150732 A1 | 8/2004 | Yamanaka | | |
| 2004/0227978 A1 | 11/2004 | Enomoto | | |
| 2006/0062562 A1 | 3/2006 | Utagawa | | |

OTHER PUBLICATIONS

Choudhury et al., "The Trilateral Filter for High Contrast Images and Meshes," *Eurographics Symposium on Rendering*, 2003, pp. 1-11.
Perona et al., "Scale-Space and Edge Detection Using Anisotropic Diffusion," *University of California Berkeley*, Dec. 20, 1988, pp. 1-30.
Fattal et al., "Gradient Domain High Dynamic Range Compression," *ACM Transactions on Graphics, Special Isue on Proc. of ACM Sig-Graph*, 2002, San. Antonio Texas, vol. 21(3), pp. 257-266.
Tomasi et al., "Bilateral Filtering of Grey and Colored Images," *Proc, IEEE Intl. Conference on Computer Vision*, 1998, pp. 836-846.
Duran et al., "Fast Bilateral Filtering for the Display of High-Dynamic Range Images," *ACM Transactions on Graphics, Special Issue on Proc. of ACM Sig-Graph*, 2002, San Antonio, Texas, vol. 21(3), pp. 249-256.
Gilboa et al., "Complex Diffusion Processes for Image Filtering," *Proc. Conf. Scale-Space*, 2001, pp. 299-307.
Wong, "Image Enhancement by Edge-Preserving Filtering," *First IEEE International Conference on Imaging Processing*, Austin, Texas, Nov. 13-16, 1994, 6 pages.
Boult, "Correcting Chromatic Aberrations Using Image Warping," *Center for Research in Intelligent Systems, Columbia University, Department of Computer Science*, 1992, 15 pages.
Boult, Local Image Reconstruction and Sub-Pixel Restoration Algorithms, *Graphical Models and Image Processing*, vol. 55, No. 1, Jan. 1993, pp. 1-12.

* cited by examiner

*Primary Examiner* — David Zarka
*Assistant Examiner* — Mark Roz
(74) *Attorney, Agent, or Firm* — Perkins Coie LLP

(57) ABSTRACT

The described methods and corresponding apparatus are for use in highlight recovery in a set of image data. The image data is inverted, treated by a digital lighting process, the subsequently inverted again. This allows the set of data image to be treated for dynamic range compression of detail in both the dark regions and the light regions by the same algorithm. In other words, the process applied to the dark regions can be performed by a correction algorithm and the process applied to the light regions performed by the same algorithm, but with the image data negated before and after the correction algorithm is applied.

60 Claims, 1 Drawing Sheet

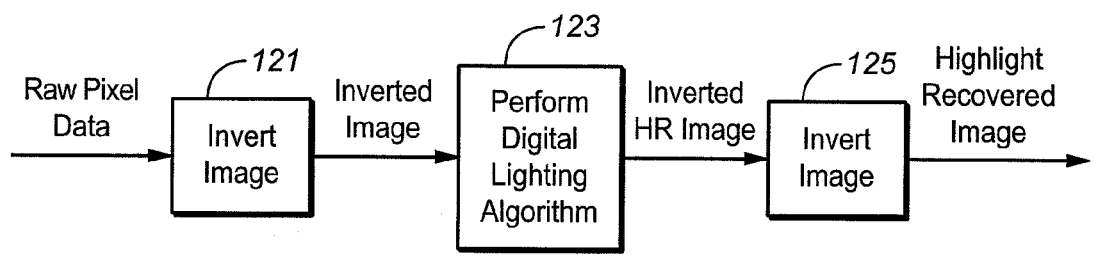

HIGHLIGHT RECOVERY USING DIGITAL LIGHTING MODULE

BACKGROUND

This application relates to image processing in digital camera, video, and other electronic digital image acquisition and/or display devices, and particularly to techniques of increasing the contrast of local image highlight details for such images.

Details in bright areas of a digital image, although they are often present in the acquired digital image data, may be hard to perceive, due to sensor non-linearities and limited system dynamic range. Consequently, such images could benefit from techniques of increasing the contrast of local image highlight details, while preserving the appearance of the overall image. This process is called Highlight Recovery (HR).

Optical sensors used in digital photography, video, and other imaging systems typically suffer from non-linear responses when rendering image regions under very bright, or very dim, lighting conditions. A unit increase of light intensity does not typically yield a unit increase in signal output from the sensor, particularly at the extreme ends of the sensor's operating range. In digital cameras, this problem is usually remedied at the dark end of the sensor's range by use of "digital lighting" algorithms, typified by Retinex-type approaches, that can enhance contrast in shadowy regions of the image. Although the problem of highlight information loss in bright areas can be addressed by the tailoring of such prior art techniques for this purpose, a search of prior art techniques indicates that a simple and straight forward approach to the recovery of highlight information in digital images, has yet to be specifically disclosed.

Prior art typically assumes that special methods and apparatuses need to be contained within any dynamic range compensation technique that aims to support both lighting and HR. HR is usually not seen in today's digital image enhancement applications, or consumer cameras, that provide a digital lighting feature. Therefore, there is substantial room for improvements in digital imaging systems by the inclusion of, or improvements in, highlight recovery.

SUMMARY

The described methods and corresponding apparatus are for use in highlight recovery in a set of image data. The image data is inverted, treated by a digital lighting process, and then subsequently inverted once again. This allows the set of image data to be treated for dynamic range compression of detail in both the dark regions and the light regions by the same algorithm. In other words, the process applied to the dark regions can be performed by a correction algorithm and the process applied to the light regions can be performed by the same algorithm, but with the image data negated before and after the correction algorithm is applied.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIG. 1 a block diagram of a basic structure of highlight recovery based on digital lighting module.

DETAILED DESCRIPTION OF EXEMPLARY EMBODIMENTS

Digital lighting techniques, which use a local method (e.g., Retinex) to lighten digital images, aim to increase the local contrast in shadow regions of an image. In order to achieve the desired results, preferred embodiments described here use a technique that inverts the image, so it is now a negative, and applies it as an input of the existing digital lighting module. This causes the module to additionally be able to increase local contrast in highlight regions of the image. Inverting the output of the digital lighting module results in an image with the contrast of image highlights increased.

Optical sensors used in digital photography, video, and other imaging systems typically suffer from non-linear responses when rendering image regions under very bright, or very dim, lighting conditions. As the behavior of image sensors at the black end differs from the behavior at the white end, the details of the dynamic range compression of the image that results in very bright areas is different than in the very dim areas. Consequently, based on the difference in sensor behaviors in the two regions, as well as due to perceptual and physical differences, the prior art has considered that any imaging system that tries to correct at both ends of the intensity scale would require one correction algorithm for the highlight tone scale and another for the shadow tone scale. Nonetheless, the inventor has found that algorithms developed for one end of the intensity scale, such as those employed in a digital lighting module, can be successfully applied to compensate for image dynamic range compression at the other end, such as for highlight recovery, by applying image inversion before and after applying the algorithm developed for the first end of the intensity scale. Consequently, the same algorithm can correct both the shadow tone scale and the highlight tone scale just by using it between a pair of image negations for one of them.

As it has generally been found that loss of detail is more noticeable in the dark regions, imaging systems often will correct for dynamic range compression just in the dark regions. According the techniques presented here, a digital lighting module (an existing algorithm intended to improve contrast in shadow regions) can also be used as a highlight recovery module (an algorithm intended to enhance detail in bright regions), by using image inversion to enable highlight recovery with any of the low-level contrast enhancement algorithms.

The methods given here allow suppliers of cameras or other imaging systems, that have already incorporated digital lighting techniques into their systems, and are desirous of adding a new highlight recovery feature, to easily do so. This will be the case for current products, as well as future generations of current products when their suppliers prefer to continue to use their lighting technique over, or in addition to, alternate approaches. An example of an alternate approach, which may be used in a complementary manner, is disclosed in the U.S. patent application entitled "Dynamic Range Compensation by Filter Cascade" by Itsik Dvir filed concurrently with the present application. The methods presented here may further be applied to off-line image processing applications, such as Nikon's "Capture Editor", Google's "Picasa", and similar products as well. Also, it should be noted that in addition to the use of a digital lighting technique for highlight recovery, in a sort of converse technique, systems which include a highlight recovery process (such as that of the U.S. patent application entitled "Dynamic Range Compensation by Filter Cascade" cited above) could apply this to digital lighting techniques through a similar before and after image negation.

A block diagram for the generation of a HR image, by the use of technology presented here and a digital lighting technique, is shown in FIG. 1. An input color image (e.g. RGB, YUV) is first inverted to create a negative image at block 121. Then, the negative image is applied to a digital lighting module 123, which performs tone mapping. Finally, the image after tone-mapping is inverted at 125 to produce the HR image. In general, any type of digital lighting module may be used at block 123, as long as it aims to increase the local contrast in shadow regions.

Note that applying the same input data directly to the digital lighting module 123 without the inverters would be a standard method for improving the darker portions of the image. (Alternately, where element 123 a highlight recovery module, it would instead be the dark regions that would go though 121 and 125.) When both highlight recovery and digital lighting are being performed on a set of image data, they may be done serially, in either order, or concurrently. The results of the two processes or channels could then be blended together, such as by adding with weighting factors, to provide the new image. For example, the image processing system could determine which portions of the image require correction for dynamic range compression of the image data and send them off to lighting or highlight recovery as appropriate, perform both processes concurrently, and add the corrected portions back to the image. It will be understood that the various modules shown in Figure can implemented in software, hardware, firmware, or a combination of these.

Various digital lighting techniques have been suggested in the literature since the first Retinex method was presented by Land 40 years ago. The U.S. patent application entitled "Dynamic Range Compensation by Filter Cascade" referred to above can also be referred to for additional discussion of these. Among the digital lighting techniques to which the presented methods here are appliacble are PC-based applications as well as embedded applications, examples of which include Nikon D-Lighting, DxO-lighting, Adobe Photoshop, HP advanced lighting technique (ALT), Picasa, and Zoran EzL. The techniques are usable both in real-time and in post-processing applications.

The methods and apparatus described here may be applied to any of the various image representations. For example, the data input at the inverter block 121 can be the RGB, YUV, YCbRr, or other image formats, as well as hue, saturation and value (HSV) and "Lab" (i.e., CIELAB, strictly CIE 1976 L*a*b*, or Hunter Lab, strictly, Hunter L, a, b), with pertinent definition for inverse color operation. Raw data, such as from a Bayer grid, can also be used.

In the case of an RGB image with components (R,G,B), inversion can be defined as:

$$(R', G', B')=((2^n-R), (2^n-G), (2^n-B)),$$

where n is the number of bits of quantization. For a YUV image with components (Y,U,V) the negative image is defined as, $$(Y', U', V')=((2^n-Y), (-U), (-V)),$$

The inverse operation in digital camera may be done either by an aritmetic (negate) operation or by use of an n-bit look-up table (LUT). In the later case, the LUT is loaded with a negative slope line. For example, for 8 bits of quantization, the look-up table would map R, G, B, or Y component inputs from zero to 255, to R', G', B', or Y' component outputs from 255 to zero, thus mapping the bright areas of the image to the low level region of the color space.

Thus, although it has been previously assumed that methods and apparatus for highlight recovery need to be specially developed and be embedded within any dynamic range compensation technique that aims to support both lighting and HR, the present concept is a simple and effective method for HR for those imaging systems which already have digital lighting method and apparatus. The present techniques are applicable to digital camera and video, for both capture and playback, as well as for other imaging systems and printers. As digital lighting technology advances, so will the quality of the results obtained from the application of the present approach.

Although the various aspects of the present invention have been described with respect to exemplary embodiments thereof, it will be understood that the present invention is entitled to protection within the full scope of the appended claims.

It is claimed:

1. A method for operating on a set of image data representing an image, the method comprising:
   identifying a first portion of the set of image data as representing a bright region of the image, to which highlight recovery is to be applied;
   identifying a second portion of the set of image data as representing a dark region of the image, to which digital lighting is to be applied;
   performing digital lighting on the dark region of the image by treating the second portion of the set of image data with a digital lighting process;
   performing highlight recovery on the bright region of the image including:
   inverting the set of image data;
   after said inverting, treating the first portion of the set of image data with said digital lighting process; and
   after said inverting the set of image data and said treating the first portion, inverting the set of image data again.

2. The method of claim 1, where said performing digital lighting on the dark region of the image is performed prior to said performing highlight recovery on the bright region of the image.

3. The method of claim 1, where said performing digital lighting on the dark region of the image is performed subsequently to said performing highlight recovery on the bright region of the image.

4. The method of claim 1, where said performing digital lighting on the dark region of the image is performed concurrently with said performing highlight recovery on the bright region of the image.

5. The method of claim 4, further comprising:
   subsequently blending results of said performing digital lighting on the dark region of the image and said performing highlight recovery on the bright region of the image.

6. The method of claim 1, wherein the set of image data is in an RGB format.

7. The method of claim 1, wherein the set of image data is in a YUV format.

8. The method of claim 1, wherein the set of image data is in a YCbCr format.

9. The method of claim 1, wherein the set of image data is in a raw data format.

10. The method of claim 1, wherein the method is performed as part of a PC-based application.

11. The method of claim 1, wherein the method is performed as part of an embedded application.

12. The method of claim 1, wherein the method is performed within a digital camera.

13. The method of claim 1, wherein the set of image data is from a video sequence.

14. The method of claim 12, wherein the method is performed as part of video capturing process.

15. The method of claim 13, wherein the method is performed as part of video playback process.

16. The method of claim 1, wherein the method is performed in real time.

17. The method of claim 1, wherein the method is performed as post-processing operation.

18. The method of claim 1, wherein the method is performed as part of a printing process.

19. A method of treating a set of image data, comprising:
performing a first correction of the set of image data to compensate for dynamic range compression of detail on a first portion of the set of image data, the first portion being either dark regions or light regions of the set of image data, the first correction being performed according to a first algorithm; and
performing a second correction of the set of image data to compensate for dynamic range compression of detail on a second portion of the set of image data, the second set being either the dark or the light regions, different from the first portion, the second correction further comprising;
negating the set of image data;
performing a correction of the negated image data according to the first algorithm; and
subsequently negating the corrected negated image data.

20. The method of claim 19, wherein the first correction and the second correction are performed serially.

21. The method of claim 19, wherein the first correction and the second correction are performed concurrently.

22. The method claim 21, further comprising:
subsequently blending results of the first and second corrections.

23. The method of claim 19, further comprising determining a portion of the set of image data to treat for highlight recovery prior to said negating the set of image data.

24. The method of claim 19, wherein the set of image data is in an RGB format.

25. The method of claim 19, wherein the set of image data is in a YUV format.

26. The method of claim 19, wherein the set of image data is in a YCbCr format.

27. The method of claim 19, wherein the set of image data is in a raw data format.

28. The method of claim 19, wherein the method is performed as part of a PC-based application.

29. The method of claim 19, wherein the method is performed as part of an embedded application.

30. The method of claim 19, wherein the method is performed within a digital camera.

31. The method of claim 19, wherein the set of image data is from a video sequence.

32. The method of claim 31, wherein the method is performed as part of video capturing process.

33. The method of claim 31, wherein the method is performed as part of video playback process.

34. The method of claim 31, wherein the method is performed in real time.

35. The method of claim 31, wherein the method is performed as post-processing.

36. The method of claim 31, wherein the method is performed as part of a printing process operation.

37. An image processing system, including:
a processor;
a determining module to determine a first portion of an image as representing a bright area, to which highlight recovery is to be applied and to determine a second portion of the image as representing a dark area, to which digital lighting is to be applied;
a digital lighting module to treat the second portion of the image with a digital lighting process, connectable to receive the output of the determining module; and
a highlight recovery module, connectable to receive the output of the determining module, to treat the first portion of the image, wherein the highlight recovery module includes:
a first inverter module connectable to receive a set of image data and provide an inverted version thereof as output;
the digital lighting module to treat the first portion of the image with said digital lighting process, connectable to receive the output of the first inverter module; and
a second inverter module, connectable to receive the output of the digital lighting module, to provide an inverted version thereof as output.

38. The image processing system 37, wherein the digital lighting module is connectable to receive the output of the highlight recovery module.

39. The image processing system 37, further comprising a blend module for combining the output of the highlight recovery module and the output of the digital lighting module.

40. The image processing system 37, wherein the set of image data is in an RGB format.

41. The image processing system 37, wherein the set of image data is in a YUV format.

42. The image processing system 37, wherein the set of image data is in a YCbCr format.

43. The image processing system 37, wherein the set of image data is in a raw data format.

44. The image processing system 37, wherein the image processing system is part of a PC-based application.

45. The image processing system 37, wherein the image processing system is part of an embedded application.

46. The image processing system 37, wherein the image processing system is part of a digital camera.

47. The image processing system 37, wherein the modules are implemented in hardware.

48. The image processing system 37, wherein the modules are implemented in software.

49. The image processing system 37, wherein the set of image data is from a video sequence.

50. The image processing system 49, wherein the image processing system is part of a video capturing system.

51. The image processing system 49, wherein the image processing system is part of a video playback system.

52. The image processing system 37, wherein the image processing system operates in real time.

53. The image processing system 37, wherein the image processing system operates as a post-processing system.

54. The image processing system 37, wherein the image processing system is part of a printer.

55. The method of claim 1, wherein operating on the set of image data is part of a dynamic range compensation operation.

56. The method of claim 55, wherein inverting the image data again comprises recovering image detail in the bright region of the image.

57. The method of claim 1, wherein inverting the image data again comprises recovering image detail in the bright region of the image.

58. The method of claim 1, wherein the digital lighting process increases local contrast of a portion of the set of image data to which it is applied.

59. The method of claim 37, wherein the digital lighting process increases local contrast of a portion of the set of image data to which it is applied.

60. The method of claim 37, wherein the highlight recovery module is connectable to receive the output of the digital lighting module.

* * * * *